United States Patent [19]

Stoll

[11] 4,328,979
[45] * May 11, 1982

[54] ADAPTOR CONNECTING PIECE FOR CONDUITS DESIGNED TO CARRY GASEOUS OR LIQUID MEDIA

[76] Inventor: Kurt Stoll, Lenzhalde 72, 7300 Esslingen/N, Fed. Rep. of Germany

[*] Notice: The portion of the term of this patent subsequent to Sep. 8, 1998, has been disclaimed.

[21] Appl. No.: 169,321

[22] Filed: Jul. 16, 1980

[30] Foreign Application Priority Data

Jul. 18, 1979 [DE] Fed. Rep. of Germany ... 7920496[U]

[51] Int. Cl.³ .............................................. F16L 33/00
[52] U.S. Cl. .................................... 285/174; 285/243; 285/322
[58] Field of Search .............. 285/322, 243, 257, 255, 285/174

[56] References Cited

U.S. PATENT DOCUMENTS

| | | | |
|---|---|---|---|
| 350,188 | 10/1886 | Cox et al. | 285/243 |
| 528,051 | 10/1894 | Whalen | 285/243 |
| 683,312 | 9/1901 | Marquardt | 285/322 X |
| 1,478,452 | 12/1923 | Nelson | 285/322 |
| 2,205,347 | 6/1940 | Darling | 285/243 |
| 2,383,692 | 8/1945 | Smith | 285/322 |
| 3,118,692 | 1/1964 | Fitzhugh | 285/322 X |
| 4,103,941 | 8/1978 | Stoll | 285/238 |

FOREIGN PATENT DOCUMENTS

| | | | |
|---|---|---|---|
| 461796 | 11/1913 | France | 285/322 |
| 505991 | 12/1954 | Italy | 285/322 |
| 609442 | 9/1960 | Italy | 285/243 |

*Primary Examiner*—Thomas F. Callaghan
*Attorney, Agent, or Firm*—Blanchard, Flynn, Thiel, Boutell & Tanis

[57] ABSTRACT

An adaptor connecting piece for conduits designed to carry gaseous or liquid media with a collet chuck type push-in sleeve into which the end of the conduit to be connected is inserted and which is equipped with several spring mounted collet chuck components distributed at regular intervals around the circumference and separated from each other by longitudinal grooves extending along the length of the push-in sleeve. The said push-in sleeve is fitted with a locking ring whose function is to exert a radial force on the collet chuck components holding them inwards in its operative position directed towards the axial outer end of the collet chuck components and releasing them in its axial inner inoperative position.

4 Claims, 2 Drawing Figures

ADAPTOR CONNECTING PIECE FOR CONDUITS DESIGNED TO CARRY GASEOUS OR LIQUID MEDIA

CROSS REFERENCE TO RELATED APPLICATION

This application is related to application Ser. No. 31 492, filed Apr. 19, 1979 and now U.S. Pat. No. 4,288,112.

BACKGROUND OF THE INVENTION

The system of connecting conduits made of a flexible material using a locking ring which may be moved backwards and forwards in an axial direction over the push-in sleeve is already widely known. If the locking ring is pushed into its operative position, the collet chuck components press against the conduit walls and grip them firmly. Where the connecting operation involves conduits made of a flexible material, the flexible material is squeezed inwards to a greater or lesser degree by the collet chuck components. This increases the firmness of the grip on the conduit since on the one hand the conduit material which is under elastic compression exerts an outward radial force on the collet chuck components and these in turn are held by an elastic force against the locking ring. On the other hand, compression or nipping of the conduit material, even if it is very slight, creates a positive axial lock. In the case of conduits made of a rigid material, that is primarily with metal pipes, these effects do not occur. In order to obtain an equally firm hold on the conduit, it will be necessary to clamp the collet chuck components harder against the conduit. Failing this, the end of the conduit might work free from the adaptor connecting piece, for example in the event of a high pressure build up or load fluctuations inside the conduit. Increased collet chuck components clamping pressure means that it will be necessary to exert a correspondingly greater force to displace the locking ring in an axial direction. This increases operating difficulties considerably. There is also a danger that the locking ring, which has an axial displacement facility, may be moved backwards unintentionally into its inoperative position, thereby releasing the connection.

The object of this particular invention was therefore to produce an adaptor connecting piece of the type mentioned at the outset which would produce a firm hold on the end of the conduit inserted not only in the case of flexible materials but also for metal conduits, even where the conduit is subjected to high pressure factors or regularly fluctuating load levels, where the force needed to form the connection is relatively small and may be exerted manually.

The present invention solves this problem by presenting a system which is of particular significance to connections involving the use of metal conduits and in which the locking ring is linked, in its operative position at least, with the collet chuck components by means of a self-locking screw connection, the said locking ring being equipped with an internal thread and the push-in sleeve being equipped with a corresponding external thread in the section containing the collet chuck components, such that the collet chuck components with their thread section are projected conically outwards with the locking ring in its inoperative position and that around the internal circumference of the push-in sleeve at a point opposite the external thread at least one ring tooth protrudes inwards over all the collet chuck components.

The locking ring is thus screwed onto the collet chuck components during assembly; the resultant amount of force required to operate the unit is relatively small, since the axial movement of the screw action forcing the collet chuck components inwards is very low. The angle of incline along the self-locking section is kept small enough to ensure that the locking ring cannot be released unintentionally. In addition, the ring tooth which is fitted to the unit concentrates effective forces at the tooth.

The adaptor connecting piece specified here is suitable not only for use with metal conduits, but is also ideal for conduits made of a flexible material, ensuring a firm hold on the conduit inserted at all times. The unit is also easy to operate.

BRIEF DESCRIPTION OF THE DRAWING

One possible construction design for this invention may be described as follows, in accordance with the drawing. The drawings show the following features.

DETAILED DESCRIPTION

Figure 1:
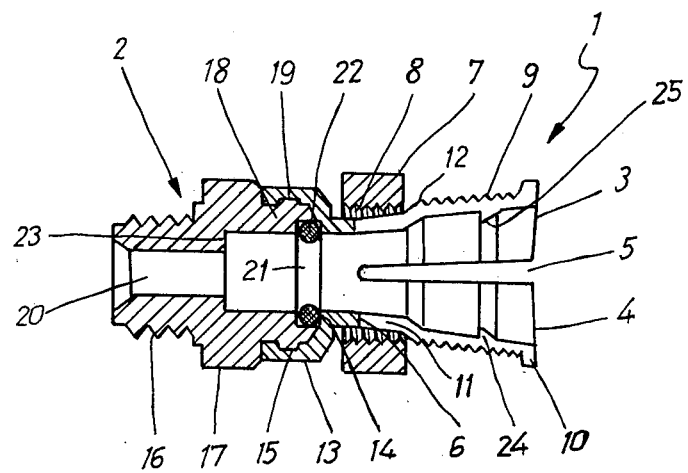
FIG. 1: longitudinal section of an adaptor connecting piece with the locking ring in its inoperative position
Figure 2:
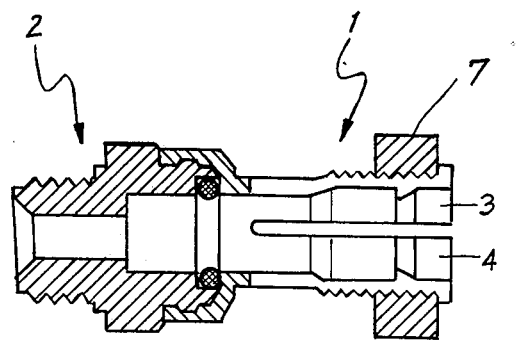
FIG. 2: arrangement as in FIG. 1 with the locking ring in its operative position

The adaptor connecting piece shown in the drawing consists of two parts, that is, a push-in sleeve 1 on one side and a separate thread sleeve 2 on the other side. The push-in sleeve 1 is of a collet chuck design, that is, it is equipped with collet chuck components 3,4 distributed at regular intervals around the circumference and these are separated from each other by longitudinal grooves 5 extending along the length of the push-in sleeve. The collet chuck components 3,4 protrude from the central section 6 of the push-in sleeve away from the thread sleeve 2; that is, the free ends of the collet chuck components are directed away from the thread sleeve. A locking ring 7 is fitted to the push-in sleeve 1 and may be moved to either of two positions. When the locking ring 7 is in its inner axial inoperative position (FIG. 1) it releases the collet chuck components 3,4 which are thereby unloaded and which protrude outwards slightly in view of their spring mounted design. In its operative position directed towards the outer axial end of the collet chuck components 3, 4 (FIG. 2), the locking ring 7 exerts a radial force on the collet chuck components 3,4 holding them pressed inwards. The locking ring 7 is provided with an internal thread 8 which is matched up with a corresponding external thread 9 located on the collet chuck component section of the push-in sleeve. The outer circumference of the collet chuck components 3,4 is therefore fitted with an external thread 9 onto which it is possible to screw the locking ring 7 with its internal thread 8. A contact ring 10 which is projected radially forwards is fitted to the outer end of the push-in sleeve 1 which prevents the locking ring from being screwed on too far or from being lost. When the unit is assembled, the collet chuck components, 3,4 may be held pressed inwards by hand far enough to allow the locking ring to slipped on over them. The external thread 9 is located directly behind the contact ring and this section of the push-in sleeve is linear in design. With the locking ring in its inoperative position as shown in FIG. 1, this section exhibits a slight degree of conicity whilst with the locking ring in its operative position as shown in FIG. 2 its form is cylindrical. Directly behind the section carrying the external thread 9 is a tapering zone 11 which is surrounded by the locking ring when the latter is in its inoperative position. The external diameter of this tapering zone 11 is less than the internal diameter of the locking ring 7 and its axial length is greater than that of the locking ring such that the locking ring is loose when in its inoperative position and releases the collet chuck components allowing them to be projected outwards under their own elastic force. A conical transition section 12 is located between the tapering section 11, whose outer circumference lies parallel to the circumference surface of the section carrying the external thread 9 and the section carrying the external thread 9 itself. This centres the locking ring 7 when the latter is screwed on. It is clear that the outer circumference of the push-in sleeve may also be designed with uniform dimensions providing that the collet chuck components are of sufficient length, that is, the section carrying the external thread may be designed to connect with the section covered by the locking ring in its inoperative position with no change in the degree of inclination. This creates uniform conicity in the expanded position as shown in FIG. 1 and a cylindrical form with uniform diameter when the locking ring is in its operative position, screwed into place as shown in FIG. 2.

The tapering section, which is also the location for the central circumference section 6 the longitudinal grooves 5 and therefore also the collet chuck components 3,4 which extend towards the free end, is connected to a roughly cylindrical extension 13 complete with a base forming a radial shoulder. There is a circular groove 15 around the inner circumference of the cylindrical extension 13.

The screw neck 2 which terminates in a screw socket 16, is fitted with an external operating collar 17 connecting the screw neck to the push-in sleeve 1. This collar is located in a forward position and may for example be of a hexagonal design for use with a spanner. The said operating collar 17 is located directly forward of a ring extension 18 whose external circumference is fitted with a ring projection 19 which is continuous like the circular groove 15 and whose cross-section corresponds to that of the circular groove. A radial through-flow passage 20 and an open recess 21 fitted with an O-ring made of a sealing material 22 are machined into the front face of the push-in sleeve and screw neck.

The push-in sleeve 1 with its roughly cylindrical extension 13 is fitted to the ring extension 18 of the screw neck 2, whereby the ring projection 19 on the outer circumference of the screw neck 2 and the circular groove 15 which matches it, mesh together inside the push-in sleeve to form a snap-in lock. When assembled, the push-in sleeve 1 with its radial shoulder 14 lies on the front face of the screw neck 2, the O-ring 22 being enclosed between the two necks to form a tight seal. In addition, the free end of the extension 13 contacts the front face of the operating collar 17 which is directed towards the push-in sleeve 1 acting as a contact face for the end of the push-in sleeve 1 when assembled. It should be pointed out that the operating collar 17 of the screw neck 2 is separated in an axial direction and is designed to fit both the front face which is inserted into the push-in sleeve 1 and the O-ring 22.

It should be noted that the snap-in or intermesh connection between the push-in sleeve 1 and the screw neck 2 is completely safe and fully reliable and it is often impossible to release the lock without destroying the components. This snap-in or intermesh connection also enables the two linked necks to be turned about their longitudinal axis.

It is also clear that in using the same design for the section of the push-in sleeve which carries the collet chuck components and the same design for the locking ring, it is possible to slip the end of the push-in sleeve facing the screw neck into the neck rather than over it. In cases where the adaptor connecting piece constitutes a single part, that is, where the screw neck and the push-in sleeve form a single unit, the section carrying the locking ring and collet chuck components may be designed as per the example described above. Finally, the adaptor connecting piece may be fitted with a second adaptor sleeve or a central distributor piece in place of the screw neck and these may be connected to other push-in sleeves.

In this example of an adaptor connecting piece, the end of a conduit designed to carry gaseous or liquid media may be inserted and fastened securely but with a release facility by means of a locking ring 7. The end of the conduit is inserted with the collet chuck components 3,4 in their expanded position and with the locking ring 7 in its inoperative position. It is inserted as far as the step shoulder 23 inside the screw neck 2 whose radial dimensions correspond to the thickness of the conduit wall creating a uniform through-flow area cross-section over its entire length. The conduit has not been illustrated in the diagrams for the sake of clarity. Once the end of the conduit has been inserted, the locking ring 7 is screwed onto the external thread 9. This operation forces the collet chuck components inwards against the conduit wall. The effort required to screw on the ring is relatively small since the axial moments of the screw action exerted on the collet chuck components are small in relation to the peripheral moments. The clamp pressure exerted on the conduit by means of the locking ring 7 when screwed into position may be judged quite accurately. Since it is therefore possible to exert high clamp pressure via a relatively small amount of effort, the type of adaptor connecting piece described here is ideally suited for use with metal conduits. However, it is of course possible to use the device for conduits made of flexible materials.

The assembly is also fitted with at least one ring tooth 24 extending over all the collet chuck components 3,4 around the inner circumference of the push-in sleeve 1 and this ring tooth 24 protrudes inwards. The profile of the ring tooth which is directed towards the screw neck 2 is set at a sharper angle than that of the profile of the tooth 25, making it easier to insert the end of the conduit than to withdraw it in the opposite direction. Effective clamping power is concentrated at this ring tooth 24. This means that the ring tooth 24 is pressed firmly and securely against the end of the conduit. It does not have sharp edges, however, but comprises a surface load bearing part which prevents any damage to conduits made of flexible materials; these merely undergo elastic compression without being cut in any way.

The screw connection formed by the internal 8 and external 9 threads is self-locking, thereby preventing the locking ring 7 from being disengaged unintentionally.

The adaptor connecting piece is extremely easy to operate and ensures a firm hold on the conduit regardless of the material used, even where this involves metal conduits. This firm hold is maintained even where the medium contained inside the conduit is under a high pressure load or is subjected to regular through-flow current fluctuation.

Although a particular preferred embodiment of the invention has been disclosed in detail for illustrative purposes, it will be recognized that variations or modifications of the disclosed apparatus, including the rearrangement of parts, lie within the scope of the present invention.

The embodiment of the invention in which an exclusive property or privilege is claimed is defined as follows:

1. A connecting piece for supply lines carrying gaseous or fluid media, comprising:
    a first elongated and hollow connecting member having a first central body segment with an enlarged end structure on one end terminating in a first axially facing surface which has a first axially facing recess therein communicating with the interior of said hollow connecting member and opening in a direction remote from said first central body segment, the bottom of said first recess defining a second axially facing surface extending parallel to said first surface, said first recess having an annular recess on the internal surface thereof intermediate said first and second surfaces, a supply line clamping means connected to said first central body segment on an end thereof remote from said enlarged end structure;
    a second elongated and hollow connecting member having a second central body segment with an end segment extending axially away from said second central body segment and a sleeve segment extending axially away from said second central body segment on a side thereof opposite said end segment, said sleeve segment having a cross-sectional size less than the cross-sectional size of said second central body segment to thereby define a third axially facing surface facing in a direction toward said first surface on said first connecting member, said sleeve terminating in a fourth axially facing surface parallel to said third surface, said fourth surface having a second axially facing recess therein communicating with the interior of said second connecting member, the bottom of said second recess defining a fifth axially facing surface extending parallel to said third and fourth surfaces, the axial spacing between said third and fourth surfaces on said second connecting member being equal to the axial spacing between said first and second surfaces on said first connecting member, said sleeve segment having an annular projection on the external surface thereof intermediate said third and fourth surfaces;
    said sleeve segment being received in said first recess with said third surface thereof engaging said first surface and with said fourth surface engaging said second surface, a compressible seal member received in said second recess and being compressed between said second and fifth surfaces, said annular projection being operatively received in said annular recess to hold said first and second connecting members in a coupled relationship and said first and third surfaces as well as said second and fourth surfaces in engagement with each other; and
    said supply line clamping means comprising:
        a collet chuck section having plural segments diverging radially outwardly from said enlarged end structure, said collet chuck section having an external thread thereon which is initially conical when said plural segments of said collet chuck section diverge radially outwardly; and
        an internally threaded locking ring adapted to threadedly engage said external thread to urge said plural segments into a cylindrical arrangement as said locking ring moves along the length of said plural segments.

2. The connecting piece according to claim 1, wherein each of said plural segments has at least one radially inwardly projecting toothed segment radially aligned with each other and on a side of each segment opposite said external thread.

3. The connecting piece according to claim 1, wherein each of said segments is connected to said enlarged end structure through a tapered segment whose diameter adjacent said enlarged end structure is less than the internal diameter of said locking ring, said tapered segment having an axial extent greater in length than the axial extent of said locking ring so that said locking ring loosely encircles said tapered segment.

4. The connecting piece according to claim 1, including a stop means on an end of said externally threaded portion of said plural segments and at an end remote from said enlarged end structure to limit the axial movement of said locking ring.

* * * * *